Going Down

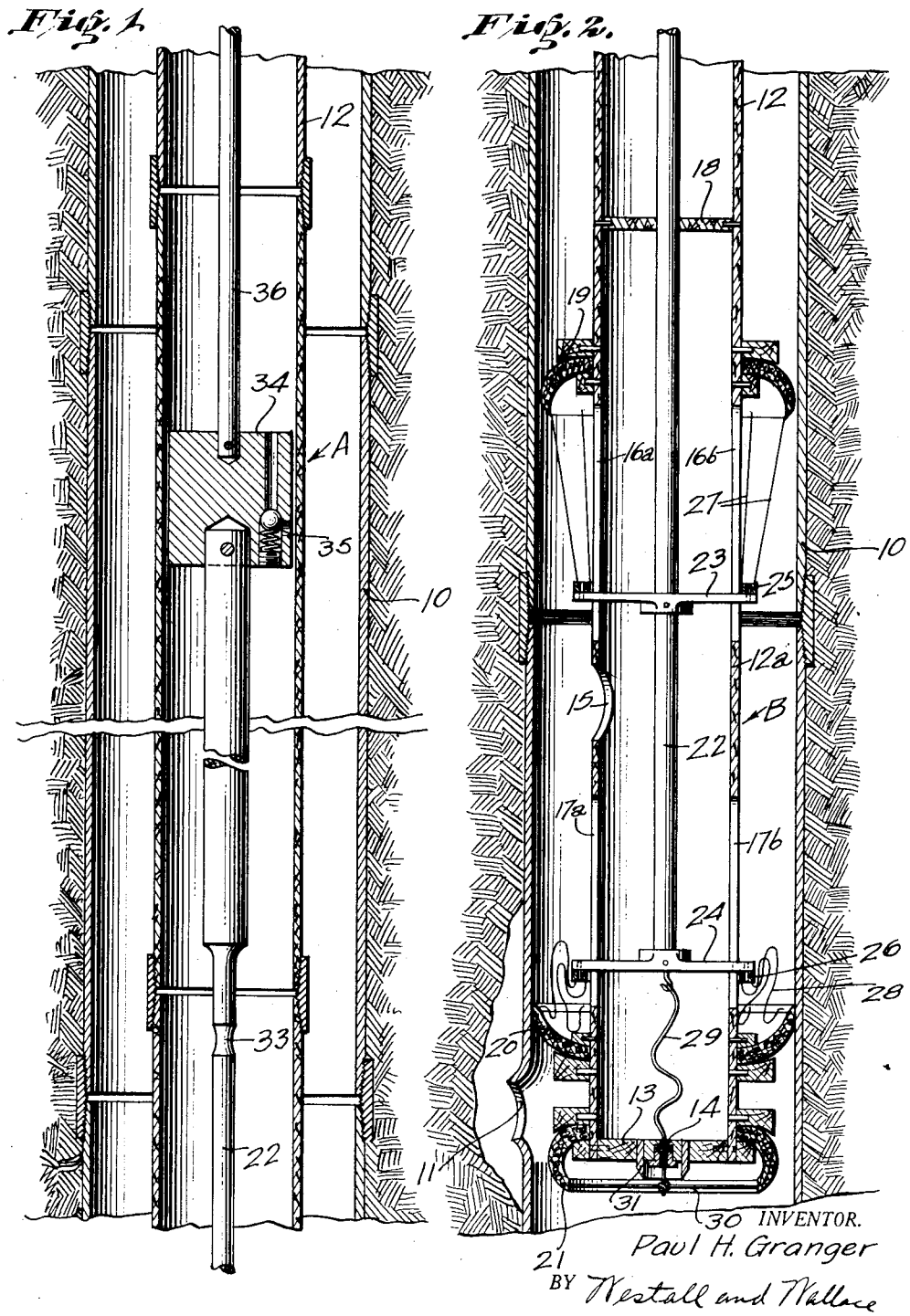

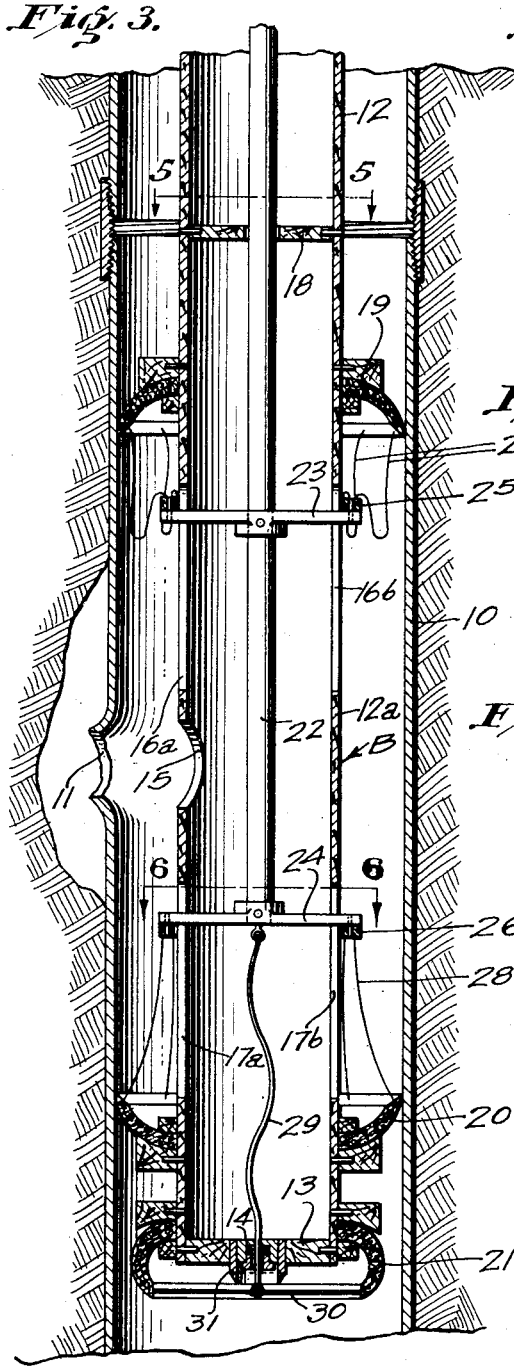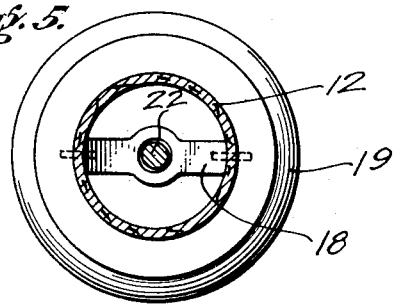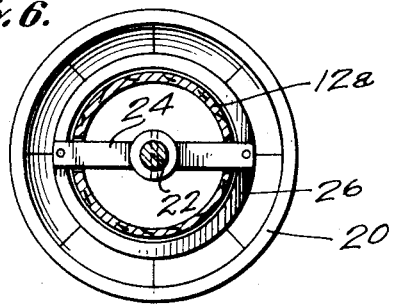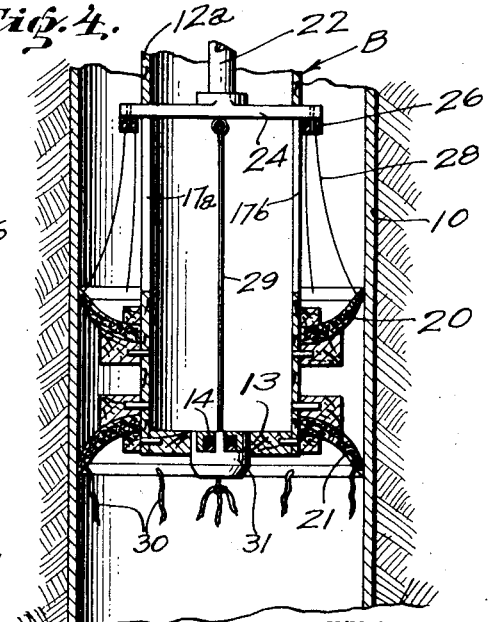

Going Up

Cementing Position

Patented June 25, 1929.

1,718,416

UNITED STATES PATENT OFFICE.

PAUL H. GRANGER, OF LOS ANGELES, CALIFORNIA

LEAK INDICATOR AND CEMENTING PLUG.

Application filed September 11, 1928. Serial No. 305,189.

This invention relates to a device for locating leaks and operation as cementing plug. Leaks in well casing and tubing, hereinafter referred to generally as piping occur frequently. It is desirable to locate these leaks without "pulling" or removing the piping for reasons well known in the art. Having located a leak, it may be sealed by introducing cement into the leak opening and also forcing the cement so introduced into position about the piping between it and its encompassing wall so as to form a seal or bond. The present invention contemplates a device which may be lowered in the well and operated to locate a leak, then maintained in leak locating position and manipulated to form a cementing plug for directing cement introduced thereto to and through the leak hole.

The objects of this invention are to provide a device slidably insertable in piping and having end walls operable to seal off a space and form a chamber therebetween, a pump member to introduce hydraulic pressure between the end wall, means to remove the pump member and enable the sealing walls to be expanded, means normally maintained in contracted position and operable to form a seal in advance of the device upon withdrawal of the pump member, and means to introduce cement into the chamber.

These objects together with other objects and corresponding accomplishments are obtained by means of the embodiment of my invention illustrated in the accompanying drawings, in which:—

Figure 7:
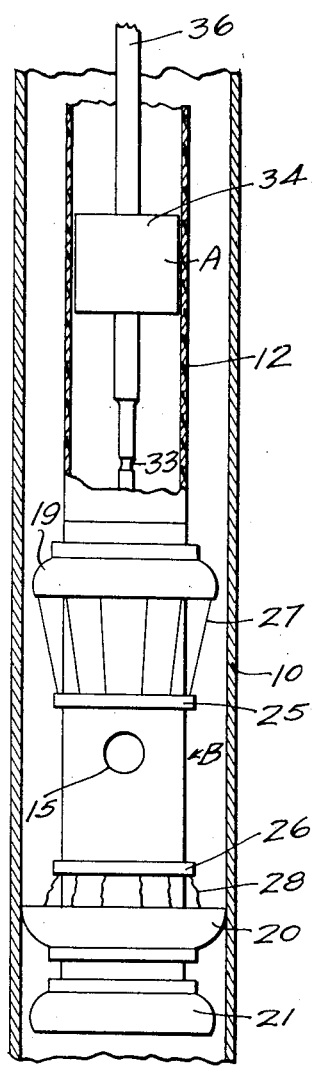
Figure 8:
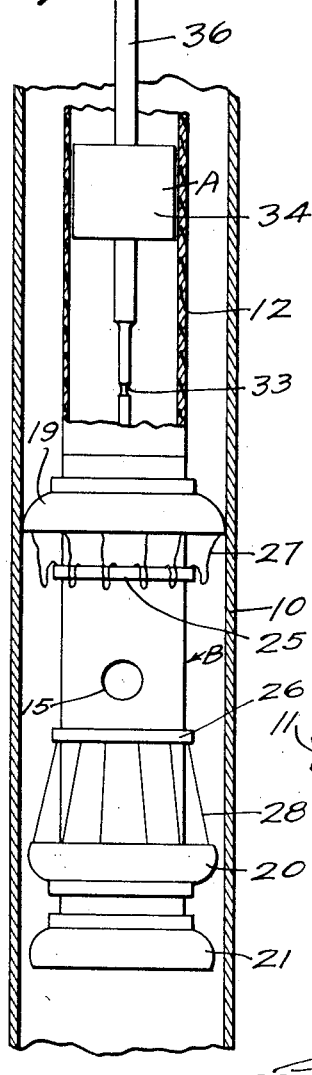
Figure 9:
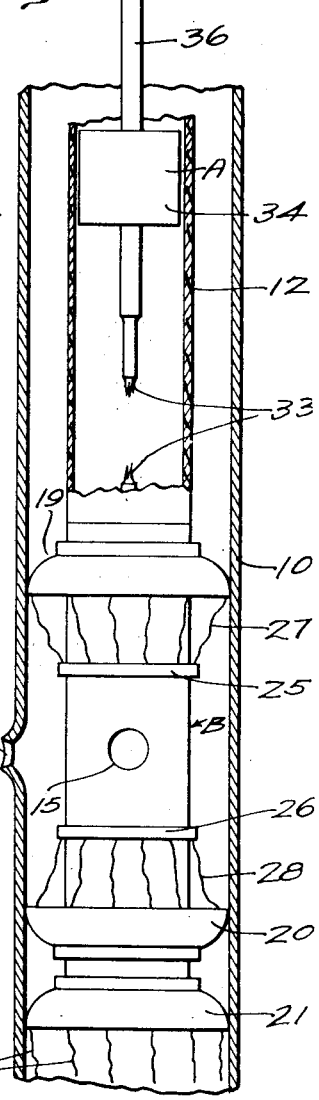

Figs. 1 and 2 are sectional views through a well hole and casing showing the upper and lower portions respectively of a leak indicator and cement plug device in position for lowering, the device being partly in section and partly in elevation; Fig. 3 is a section through a well hole casing showing the lower portion of the device at a leak and in position for testing for the leak; Fig. 4 is a fragmentary view partly in elevation showing the advance packing released; Figs. 5 and 6 are sections taken on the lines correspondingly numbered in Fig. 3; and Figs. 7, 8 and 9 are diagrammatic views showing different positions of the packing cups in manipulation of the device.

Referring more particularly to the drawing, 10 indicates a well casing disposed in a well hole and having a leak hole 11 therein.

The device comprises broadly a pump member A operating in a tubing serving as a barrel and a test and plug chamber member B mounted on the tubing.

Tubing 12 extends downwardly in the casing, a section 12$^a$ being closed at the bottom by a plug 13 having a stuffing box 14 for the passage of a line therethrough. In a side of the section 12$^a$ is an opening 15. Above the opening are longitudinally extending slots 16$^a$ and 16$^b$ diametrically opposed to one another. Below the opening 15 is another pair of diametrically opposed slots 17$^a$ and 17$^b$. Extending diametrically across the section 12$^a$ is a guide 18 for a connecting rod. Secured to the tubing section 12$^a$ is a flexible cup 19 which may be made of leather and secured to the lower end of the tubing is a similar cup 20. Cups 19 and 20 serve as walls for a chamber formed therebetween, and the concave sides of the cups face one another. Secured to the tubing below cup 20 is an advance cup 21 with its convex side opposing the convex side of cup 20. Any suitable means may be provided for securing the cups to the tubing.

Disposed within the tubing section 12$^a$ is a cross member reciprocable therein and comprising a connecting rod 22 to which is secured cross arms 23 and 24. The ends of the arms project through the slots in the tubing. Secured to arm 23 is a ring 25, and a similar ring 26 is secured to arm 24. A set of flexible lines marked 27 secure ring 25 to the outer edge of cup 19. A similar set of flexible lines marked 28 connect the outer edge of a cup 20 to ring 26. The arms are so spaced with respect to the length of the flexible members 27 and 28 that when the cross member is in its lower position as shown in Fig. 2, line 27 will be tight and line 28 will be slack. At the uppermost position of the cross member, line 27 will be slack and line 28 will be tight. When the lines connected to a cup are tight, the edge of the cup is drawn inwardly out of sealing contact with the casing, and when the lines connected to a cup are slack, the cup is free to enable it to be expanded into sealing contact with the casing. There is an intermediate position of the cross member such that there is sufficient slack in the lines connected to the uppermost and lowermost rings to enable both cups to be expanded into sealing position.

Connected to the lower end of the rod 22 is a flexible line 29 which passes through the stuffing box 13 and is connected to the hub of spider form consisting of flexible lines 30 strung between the edge of advance cup 21. Projecting from the closure plug 13 is a ring cutter 31 having a sharp edge against which the spider may be drawn so as to sever the line. This may be accomplished by drawing line 29 tight and pulling upwardly upon the spider to cause the line 30 to engage the cutting edge and thus be severed. The length of the lines 29 is made such that when the cross member is in its extreme uppermost position, the lines 29 will have been tightened and the spider moved against the cutter so as to sever the lines 30.

Rod 22 is fragile, and may be made of wood having a portion 33 of reduced cross section so as to weaken the rod at this point for the purpose of causing it to be broken upon sufficient tension being exerted on the rod. The upper end of rod 22 is connected to a valved plunger 34. This plunger has a check valve 35 permitting fluid to pass downwardly to the plunger, yet to prevent upward passage. Connected to the plunger 31 is a rod 36 serving for reciprocating the plunger and manipulating the cross head. Rod 36 extends to the surface of the ground for convenient manipulation thereof.

The tubing string 12 is lowered with the cross head positioned as shown in Fig. 2. This will permit liquid to pass around cups 20 and 19. The device is lowered to a point at which it is desired to make a test. The rod 36 is then moved upwardly so as to slacken both sets of lines 27 and 28. The rod is then reciprocated for a limited distance so as not to tighten either of the set of lines. This reciprocates the plunger and causes a pumping action, the cups 19 and 20 sealing the chamber against the passage of liquid upwardly or downwardly. If the pump stalls, it is an indication that there is no opening in the casing wall, or that there is no leak. The rod 36 is then lowered slowly, liquid gradually passing around the cup 19 and the set of lines 27 being drawn tight while the lines 21 are slackened. The device is then lowered to the next test position and the test repeated. If it is desired to raise the device, the rod 22 is elevated so as to create a tightening of the set of lines 28 and a slackening of the lines 27. Thereupon the device may be elevated. The search for the leak is then continued. When the cups 19 and 20 are positioned in the casing at the point of the leak as shown in Fig. 3, lines 27 and 28 are slackened, and the pump started. Liquid may be pumped through the leak so that the pump does not stall. Having located the leak, the rod 36 is drawn to its extreme uppermost position causing line 29 to be tightened and the spider to be pulled upwardly so that the cutter 31 severs the lines 30 of the spider and allows cup 31 to be expanded.

There is a substantially incompressible body of liquid in the casing below the device, and the cup 21 tends to maintain the device in position. Sufficient upward pull is then exerted upon the rod 36 to cause the rod 22 to be broken or parted, which will occur at the reduced portion 33. This releases the cross member and the weight thereof is not sufficient to collapse the cup 19. The plunger 34 is then withdrawn from the tubing 12, and cement pumped into the tubing, passing outwardly through the opening 15 in the chamber and thence through the leak opening 11. If the cement is not allowed to fully harden, and the tubing is withdrawn, sufficient plastic cement may remain in the cavity outside of the casing and in the leak hole 11, this cement being in a state so as to eventually harden. If the cement is allowed to fully harden, the tubing may be broken down and the device together with the cement drilled out.

What I claim is:—

1. In a device for locating leaks in piping, the combination of spaced packing cups forming a chamber therebetween, a reciprocable member disposed between said cups, means connecting said cups to contract the latter, said member at the limits of its travel alternately contracting one cup and enabling the other to expand, said member having an intermediate position enabling both cups to expand, and means connected to said chamber and operable to create hydraulic pressure therein.

2. In a device for locating leaks in piping, the combination of spaced packing cups forming a chamber therebetween, a reciprocable member disposed between said cups, means connecting said cups to contract the latter, said member at the limits of its travel alternately contracting one cup and enabling the other to expand, said member having an intermediate position enabling both cups to expand, a pump barrel connected to said chamber, a valved plunger therein, a connecting rod securing said plunger to said member whereby to actuate the latter, and a rod for reciprocating said plunger.

3. In a device for locating leaks in piping, the combination of spaced packing cups forming a chamber therebetween, a reciprocable member disposed between said cups, flexible lines connecting said cups to said member for contracting said cups, said lines being of such length that at the limits of the travel of said member alternately one cup will be maintained contracted and the other free enabling it to expand and at an intermediate position of said member both cups will be enabled to expand, and means for creating hydraulic pressure in said chamber.

4. In a device for locating leaks in piping, the combination of spaced packing cups forming a chamber therebetween, a reciprocable member disposed between said cups, flexible lines connecting said cups to said member for contracting said cups, said lines being of such length that at the limit of the travel of said member alternately one cup will be maintained contracted and the other free enabling it to expand and at an intermediate position of said member both cups will be enabled to expand, a pump barrel connected to said chamber, a valved plunger therein, a connecting rod securing said plunger to said member whereby to actuate the latter, and a rod for reciprocating said plunger.

5. In a device for locating and sealing leaks in piping, the combination of spaced end walls forming a chamber therebetween, control means operable on both end walls to alternately enable one end wall to be expanded into sealing position with respect to said piping and the other to be maintained against expansion, said means being positionable to enable both end walls to be expanded simultaneously, a pump member connected to said chamber, means to withdraw said pump member and release said control means enabling both walls to be expanded into sealing position, and a conduit for introduction of cement into said chamber.

6. In a device for locating and sealing leaks in piping, the combination of spaced packing cups forming a chamber therebetween, a reciprocable member disposed between said cups, means connecting said cups to contract the latter, said member at the limits of its travel alternately contracting one cup and enabling the other to expand, said member having an intermediate position enabling both cups to expand, a pump means connected to said chamber and operable to create hydraulic pressure therein, a conduit for introduction of liquid to said chamber connected to said pump member, means to withdraw said pump member and release said reciprocable member enabling both packing cups to be expanded into sealing position, said conduit serving for introducing cement into said chamber.

7. In a device for locating and sealing leaks in piping, the combination of spaced packing cups forming a chamber therebetween, a reciprocable member disposed between said cups, means connecting said cups to contract the latter, said means at the limits of its travel alternately contracting one cup and enabling the other to expand, said members having an intermediate position enabling both cups to expand, a pump barrel connected to said chamber, a valved plunger therein, a connecting rod securing said plunger to said reciprocable member whereby to actuate the latter, a rod for reciprocating said plunger, means to withdraw said plunger and release the said reciprocable member enabling both packing cups to be expanded into sealing position, said pump barrel serving for introduction of cement into said chamber.

8. In a device for locating and sealing leaks in piping, the combination of spaced packing cups forming a chamber therebetween, a reciprocable member disposed between said cups, flexible lines connecting said cups to said reciprocable member for contracting said cups, said lines being of such length that at the limits of travel of said reciprocable member alternately one cup will be maintained contracted and the other free enabling it to be expanded and at an intermediate position of said reciprocable member both cups are enabled to expand, a pump member for creating hydraulic pressure in said chamber, a conduit for liquid connected to said pump member means to withdraw said pump member and release the said reciprocable member enabling both cups to be expanded into sealing position, said conduit serving for the introduction of cement into said chamber.

9. In a device for locating and sealing leaks in piping, the combination of spaced packing cups having a chamber therebetween, a reciprocable member disposed between said cups, flexible lines connecting said cups to said member for contracting said cups, said lines being of such length that at the limit of the travel of said member alternately one cup is maintained contracted and the other free enabling it to expand and at an intermediate position of said member both cups are enabled to expand, a pump barrel connected to said chamber, a valved plunger therein, a connecting rod securing said plunger to said member whereby to actuate the latter, a rod for reciprocating said plunger, means to withdraw said plunger and release said reciprocable member enabling both packing cups to be expanded into sealing position, and a conduit connected to said pump barrel for the introduction of cement into said chamber.

10. In a device for locating and sealing leaks in piping, the combination of spaced packing cups forming a chamber therebetween, a reciprocable member disposed between said cups, means connecting said cups to contract the latter, said member at the limits of its travel alternately contracting one cup and enabling the other to expand, said member having an intermediate position enabling both cups to expand, tubing connected to said chamber forming a pump barrel, a valved plunger therein, a connecting rod securing said plunger to said reciprocable member whereby to actuate the latter, a rod for reciprocating said plunger and to withdraw said plunger and release said reciprocable member enabling both cups to be expanded, said tubing serving for introduction of cement into said chamber.

11. In a device for locating and sealing leaks in piping, the combination of spaced packing cups forming a chamber therebetween, a reciprocable member disposed between said cups, flexible lines connecting said cups to said reciprocable members for contracting said cups, said lines being of such length that at the limits of travel of said member alternately one cup will be maintained contracted and the other free enabling it to be expanded and at intermediate position of said member both cups will be enabled to expand, tubing connected to said chamber forming a pump barrel, a valved plunger therein, a connecting rod securing said plunger to said reciprocable member whereby to actuate the latter, a rod for reciprocating said plunger and to withdraw said plunger and release said reciprocable member, said tubing serving for introduction of cement into said chamber.

12. In a device for locating and sealing leaks in piping, the combination of spaced end walls forming a chamber therebetween, means operable on both end walls to alternately enable one end wall to be expanded into sealing position with respect to said piping and the other to be maintained against expansion, said means being positionable to enable both end walls to be expanded simultaneously, a pump member connected to said chamber, an advance packing cup disposed beyond one of said first mentioned walls, flexible means holding said advance cup in contracted position, a severing device, said pump member being withdrawable, said severing device being connected to said pump member for actuation thereof by withdrawal of said member to sever said flexible means and enable said advance packing cup to be expanded.

13. In a device for locating and sealing leaks in piping, the combination of spaced packing cups forming a chamber therebetween, a reciprocable member disposed between said cups, means connecting said cups to contract the latter, said member at the limits of its travel alternately contracting one cup and enabling the other to expand, said member having an intermediate position enabling both cups to be expanded, a withdrawable pump means connected to said chamber and operable to create hydraulic pressure therein, a conduit for liquid connected to said pump means an advance packing cup disposed beyond one of said first mentioned packing cups, flexible means holding said advance cup in contracted position, a severing device connected to said reciprocable member, means connecting said reciprocable member to said pump means, said severing device being actuated by withdrawal of said pump means to sever said flexible means and enable said advance packing cup to be expanded, said conduit serving for introduction of cement to said chamber.

14. In a device for locating and sealing leaks in piping, the combination of spaced packing cups forming a chamber therebetween, a reciprocable member disposed between said cups, means connecting said cups to contract the latter, said member at the limits of its travel alternately contracting one cup and enabling the other to be expanded, said member having an intermediate position enabling both cups to be expanded, a pump barrel connected to said chamber, a valved plunger therein and withdrawable from said barrel, a connecting rod securing said plunger to said reciprocable member whereby to actuate the latter and disconnectible therefrom, a rod for reciprocating said plunger, an advance cup disposed beyond one of said first mentioned packing cups, flexible means holding said advance cup in contracted position, a severing device connected to said reciprocable member for actuation thereof upon withdrawal of said plunger to sever said flexible means and enable said advance packing cup to be expanded, said barrel serving for introduction of cement.

15. In a device for locating and sealing leaks in piping, the combination of spaced packing cups forming a chamber therebetween, a reciprocable member disposed between said cups, flexible lines connecting said cups to said reciprocable member for contracting said cups, said lines being of such length that at the limits of travel of said reciprocable member alternately one cup will be maintained contracted and the other free enabling it to be expanded and at an intermediate position of said member both cups will be enabled to be expanded, a withdrawable pump member for creating hydraulic pressure in said chamber, a conduit for liquid connected to said pump member, means connecting said pump member and said reciprocable member, an advance cup disposed beyond one of said first mentioned packing cups, flexible means holding said cup in contracted position, a severing device connected to said reciprocable member for actuation thereof upon withdrawal of said pump member to sever said flexible means and enable said advance packing cup to be expanded, said conduit serving for introduction of cement to said chamber.

16. In a device for locating and sealing leaks in piping, the combination of spaced packing cups forming a chamber therebetween, a reciprocable member disposed between said cups, flexible lines connecting said cups to said member for contracting said cups, said lines being of such length that at the limit of travel of said reciprocable member alternately one cup is maintained contracted and the other free enabling it to expand, and at an intermediate position of said member both cups are enabled to expand, a pump barrel connected to said chamber, a valved plunger therein, a connecting rod securing said plunger to said reciprocable member and disconnectible therefrom, said pump plunger actuating said reciprocable member, a rod for operating said plunger, an advance packing cup disposed beyond one of said first mentioned packing cups, flexible means holding said advance cup in contracted condition, a severing device connected to said cup member for actuation thereof upon withdrawal of said member to sever said flexible means and enable said advance packing cup to be expanded, said pump barrel serving for introduction of cement into said chamber.

In witness that I claim the foregoing I have hereunto subscribed my name this 29th day of August, 1928.

PAUL H. GRANGER.